UNITED STATES PATENT OFFICE.

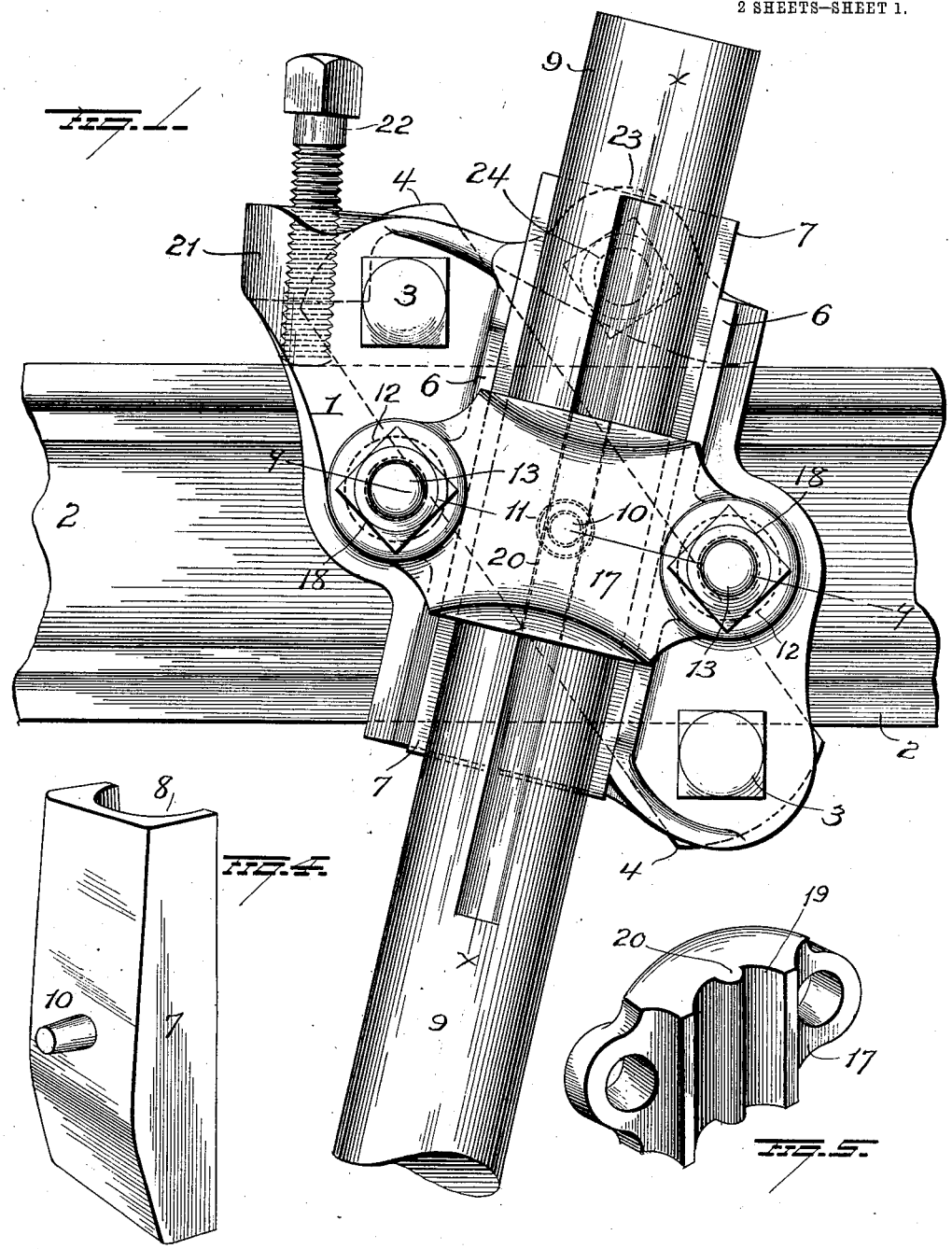

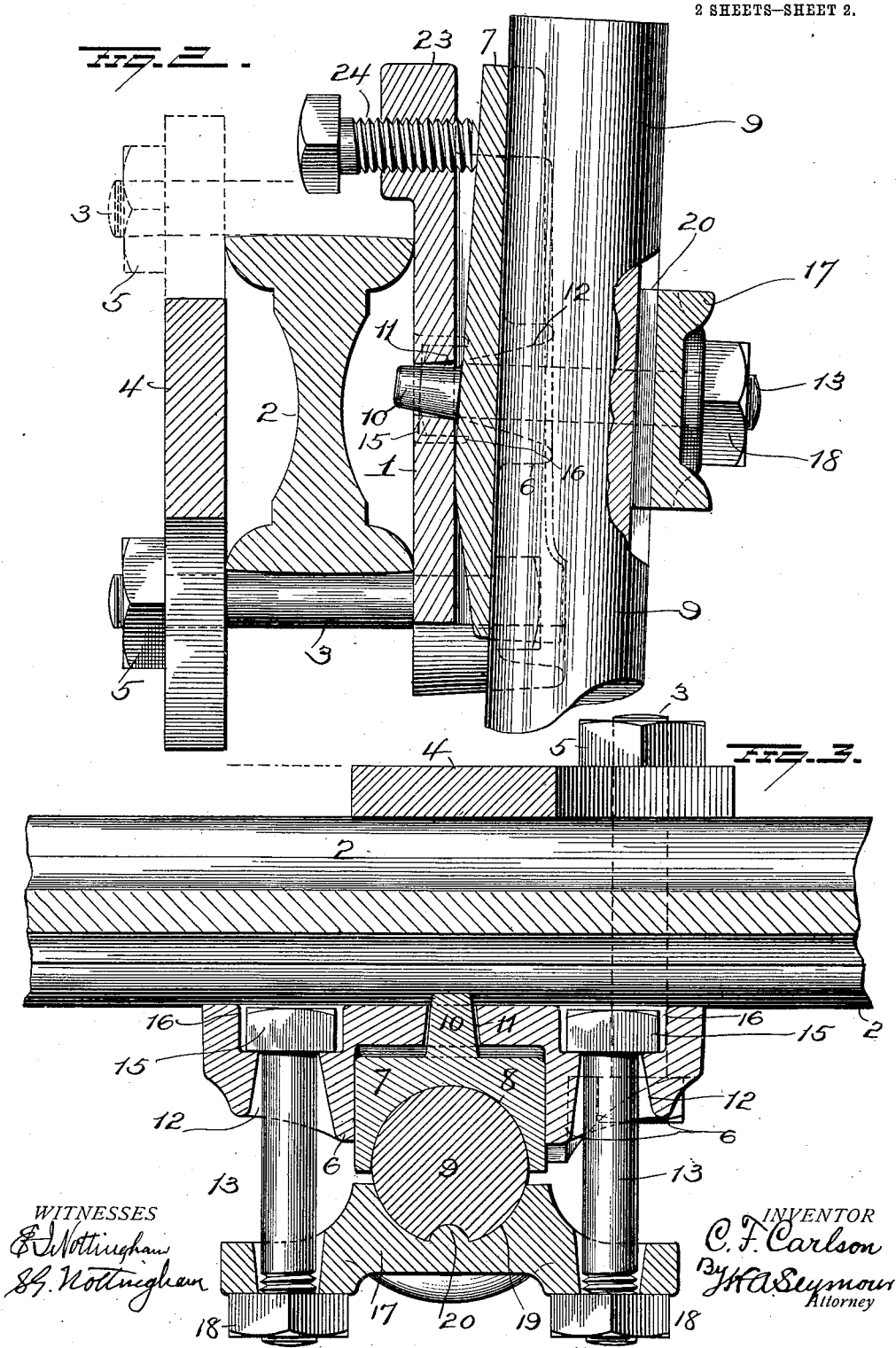

CHARLES F. CARLSON, OF SOUTH BEND, INDIANA, ASSIGNOR TO OLIVER CHILLED PLOW WORKS, OF SOUTH BEND, INDIANA.

ATTACHMENT FOR PLOWS.

1,097,299.  Specification of Letters Patent.  Patented May 19, 1914.

Application filed December 27, 1913. Serial No. 808,994.

*To all whom it may concern:*

Be it known that I, CHARLES F. CARLSON, of South Bend, in the county of St. Joseph and State of Indiana, have invented certain new and useful Improvements in Attachments for Plows; and I do hereby declare the following to be a full, clear, and exact description of the invention, such as will enable others skilled in the art to which it appertains to make and use the same.

This invention relates to improvements in attachments for plows and more particularly to adjustable clamping devices for connecting the round shank of a colter or jointer with the beam of a plow,—the object of the invention being to provide simple and efficient clamping devices for the purpose stated, having various adjusting means for facilitating the correct positioning of the colter, especially the accurate adjustment of the colter or jointer to effect the correct width of cut, with respect to the plow body employed.

With this and other objects in view, the invention consists in certain novel features of construction and combinations of parts as hereinafter set forth and pointed out in the claims.

In the accompanying drawings; Figure 1 is a view showing the application of my invention to a plow beam; Fig. 2 is a sectional view on the line $x$—$x$ of Fig. 1; Fig. 3 is a sectional view on the line $y$—$y$ of Fig. 1, and Figs. 4 and 5 are detail views.

My improved clamp comprises a base plate 1 seated against one side of a plow beam 2 and having sufficient height or length to project above and below said beam. The upper and lower projecting portions of the plate are provided with holes for the free passage of bolts 3, 3, having heads to rest against the front face of the plate. These bolts are disposed above and below the plow beam and pass through holes in a clamping bar 4 disposed against the rear side of the plow beam, the free ends of said bolts being threaded for the reception of nuts 5 which bear against the outer face of the clamping bar 4. By these means, the base plate 1 may be secured at the proper position on the plow beam.

The base plate is provided on its outer side with parallel flanges 6, 6, between which a block 7 is disposed, said block having a curved seat 8 for the reception of the round shank 9 of a colter or jointer. The block 7 is provided on its back with a pintle 10 which loosely enters a socket 11 in the base plate to prevent displacement of said block, and between said pintle and one end of the block, the back of the latter is made with a high part or protuberance, as indicated at $11^a$ which constitutes a bearing for the block against the base plate 1 and permits said block to be rocked on such bearing to effect an adjustment of the colter shank, as hereinafter more fully explained.

Near respective edges of the base plate 1, approximately midway between the ends of the flanges 6, said base plate is made with holes 12, for the free passage of bolts 13. The holes 12 are considerably larger in diameter than the diameter of the bolts 13 and the heads 15 on said bolts are seated and movable in sockets or recesses 16 made in the rear face of the base plate 1. The outer ends of the bolts pass through the end portions of a clamping plate 17, and said bolts are threaded for the reception of nuts 18 which bear against the outer face of the clamping plate 17. The inner side of the clamping plate 17 is made with a curved seat 19 for its accommodation to the round shank of the colter, and said clamping plate is also provided with an integral rib or key 20 to enter a groove in the colter shank.

At its upper left hand corner, the base plate 1 is made with a lug 21, through which a vertically disposed adjusting screw 22 passes and engages the upper side of the plow beam. A lug 23 is formed at the upper edge of the base plate and through this lug, a horizontal adjusting screw 24 passes and engages the block 7.

By loosening the nuts on the bolts 13 (thus loosening the clamping plate 17), the colter shank may be adjusted vertically and at such time, the block 7 will be prevented from dropping out by engagement of the pintle 10 with the socket 11 in the base plate. With the key 20 of clamping plate 17 engaging the groove in the colter shank, and by loosening the bolts 13, the colter shank may be twisted in the block 7, and the colter thus be adjusted in correct line of draft when used on a beam landed either for two or three horses. By loosening the bolts 3 and adjusting the screw 22, a fore or aft adjustment of the collar may be effected. By means of the screw 24, the block 7 may be rocked on its bearing against the base plate, to effect lateral adjustment of the colter so as to cause the latter to cut the correct width with relation to the plow body employed.

My improvements are simple and compact in construction; will readily permit the various adjustments of the colter, and will hold the colter shank firmly in position when adjusted.

Having fully described my invention what I claim as new and desire to secure by Letters-Patent, is:—

1. The combination with a base plate and means for clamping the same to a plow beam, of a block mounted to rock on said base plate and having a shank receiving seat, a clamping plate having a shank receiving seat, means securing the clamping plate to the base plate, and an adjusting screw passing through the base plate and engaging the block for rocking the latter.

2. The combination of a base plate having parallel flanges, means for securing said base plate to a plow beam, a block disposed between and guided by said flanges and having a rocking bearing on the base plate, a clamping plate, said block and clamping plate having shank receiving seats, means for securing the clamping plate to the base plate, and means carried by the base plate and engaging said block for rocking the latter.

3. The combination with a base plate and means for clamping the same to a plow beam, of a block mounted on the base plate and provided with a pintle engaging the base plate, a clamping plate, means connecting the clamping plate with the base plate, said block and clamping plate having shank receiving seats, and means for effecting rocking adjustment of said block.

4. The combination with a base plate and means for clamping the same to a plow beam, of an adjusting screw carried by the base plate and adapted to engage the top of the beam, a block mounted to rock on said base plate, a clamping plate, means connecting said clamping plate with the base plate, said block and clamping plate having shank receiving seats, and an adjusting screw carried by the base plate and engaging the block to rock the latter.

5. The combination with a base plate, a shank and means for securing the base plate to a plow beam, of a block mounted on said plate, a clamping plate, said block and clamping plate having seats to receive the shank, a key carried by said clamping plate to engage in a groove in said shank, and adjustable means connecting the clamping plate with the base plate independently of the securing means for the base plate to the beam.

In testimony whereof, I have signed this specification in the presence of two subscribing witnesses.

CHARLES F. CARLSON.

Witnesses:
EDWIN NICAR,
KATE E. BUCKLEY.